United States Patent
Strogov et al.

(10) Patent No.: US 12,418,567 B2
(45) Date of Patent: Sep. 16, 2025

(54) RANSOMWARE PROTECTION IN ADVANCED INJECTION-BASED ATTACKS

(71) Applicant: Acronis International GmbH, Schaffhausen (CH)

(72) Inventors: Vladimir Strogov, Singapore (SG); Aliaksei Dodz, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 114 days.

(21) Appl. No.: 18/519,789

(22) Filed: Nov. 27, 2023

(65) Prior Publication Data

US 2025/0175498 A1    May 29, 2025

(51) Int. Cl.
H04L 29/06    (2006.01)
H04L 9/40     (2022.01)

(52) U.S. Cl.
CPC ...... *H04L 63/1491* (2013.01); *H04L 63/1466* (2013.01)

(58) Field of Classification Search
CPC ............... H04L 63/1491; H04L 63/029; H04L 63/1466
See application file for complete search history.

(56) References Cited

U.S. PATENT DOCUMENTS

| | | |
|---|---|---|
| 10,938,854 B2 | 3/2021 | Strogov et al. |
| 11,494,491 B2 | 11/2022 | Strogov et al. |
| 11,611,586 B2 | 3/2023 | Strogov et al. |
| 2020/0204589 A1* | 6/2020 | Strogov .............. H04L 63/1416 |
| 2021/0160284 A1* | 5/2021 | Strogov .............. H04L 63/0245 |
| 2021/0294910 A1* | 9/2021 | Subramanian ...... G06F 21/6209 |
| 2023/0325499 A1 | 10/2023 | Aharoni et al. |

* cited by examiner

*Primary Examiner* — Wasika Nipa
(74) *Attorney, Agent, or Firm* — ESPE Legal Consultancy FZ-LLC

(57) ABSTRACT

Systems and methods for ransomware protection in advanced injection-based attacks. The call stack(s) of injected threads are analyzed and a preliminary verdict of benign or malicious can be determined. Additional sensors collect data to associate injected threads with other activities or actors to further estimate the injected thread being benign or malicious. If the threat level is high enough, such as over a given threshold, the preliminary verdict can be determined to be malicious. Subsequently, one or more virtual honeypots are generated for the suspicious threads and the injected thread's response to the virtual honeypots included in anti-ransomware heuristic analysis.

20 Claims, 3 Drawing Sheets

RANSOMWARE PROTECTION IN ADVANCED INJECTION-BASED ATTACKS

TECHNICAL FIELD

The invention relates to the field of computer security. More particularly, the invention relates to the detection and remediation of malware code injections.

BACKGROUND

Modern computing systems face a critical challenge in safeguarding their valuable data and operations against the ever-evolving threat of malware and ransomware attacks. Ransomware, for example, is typically malicious software that encrypts or blocks access to a system's files until a ransom is paid. Ransomware attacks have become a significant menace to computing systems, causing financial losses, operational disruptions, and potential data breaches.

One of the conventional ways by which malicious processes are detected is with file honeypots. Honeypots are decoy files injected into filesystem directories to attract and identify suspicious processes. In particular, file honeypots can be inserted on a storage device along with real files to bait suspicious processes to reveal themselves as malware.

However, there is a danger that a malicious thread may be injected to run inside an otherwise trusted process. The problem of protection from "injected" malware is typically more complex than protection from independent malicious processes because typical honeypots do not identify malicious threads injected into benign processes.

Therefore, there is a need for improved malware and ransomware protection to effectively detect injected malware in trusted processes. In addition, there is a need for systems and methods that dynamically respond to a diversity of ransomware behavior and types and yet are resource-efficient and effectively protect a computing system from malware without adding to system overhead.

SUMMARY

Embodiments described or otherwise contemplated herein substantially meet the aforementioned needs of the industry. Embodiments described herein include systems and methods for protecting computing systems (CS) against ransomware attacks using virtual file honeypots (VFHs). In particular, in contrast to existing virtual honeypot solutions targeted at suspected processes, embodiments provide detection of malicious injections in benign processes. In an embodiment, virtual file honeypots are generated specifically for injected threads.

Storage consumption is reduced for VFHs targeted at injected threads compared to the file snapshots typically used for general honeypots. For example, storage or file structure is not created for a VFH. Backup operations do not see such VFHs, so VFHs are not included in backup storage. VFHs thereby protect a computing system from malware without adding to system overhead. In an additional related advantage, the use of VFHs is resource-efficient because the use of VFHs does not add to system overhead.

Ransomware is detected sooner, for example, by generating a plurality of VFHs targeted at a suspicious thread. The suspicious thread can be detected before the suspicious thread gets to real files.

In particular, embodiments utilize tailored security parameters for VFHs generation such that VFHs can be generated to be targeted for concrete cases, such as CS environment information, a plurality of characteristics of an injected thread, auxiliary information, or an execution stack.

In an embodiment, a method for protecting a computing system (CS) against ransomware attacks using virtual file honeypots (VFHs) under virtual honeypot driver control comprises identifying a trusted process launched on a computing device; monitoring a thread associated with the trusted process using a control point; detecting activity of the thread based on the control point; receiving, from the trusted process, an execution stack; identifying, based on sensor data, an injector associated with injection of an injected thread and determining a plurality of characteristics associated with the injection and corresponding to the injected thread; applying a first machine learning module to the execution stack and the plurality of characteristics associated with the injection to generate a preliminary verdict, wherein the preliminary verdict determines that the injected thread is a potential malware injection when the preliminary verdict exceeds a predefined threshold; generating VFH security parameters by applying a second machine learning module to a CS environment information, the plurality of characteristics of the injected thread, auxiliary information, or the execution stack; generating a plurality of VFHs based on the security parameters; providing the injected thread with the plurality of VFHs mixed with real system files; and detecting the injected thread as a malware injection by performing a heuristic analysis.

In an embodiment, a system for protecting a computing system (CS) against ransomware attacks includes a virtual honeypot driver configured to: monitor at least one injected thread associated with at least one trusted process using at least one control point, generate a plurality of VFHs based on the security parameters, and provide the injected thread with the plurality of VFHs mixed with real system files, a sensor configured to determine a plurality of characteristics of injection of the injected thread; at least one control point configured to: detect activity of the at least one injected thread, and provide at least one execution stack for the at least one trusted process to the virtual honeypot driver; a first machine learning module operably coupled to the virtual honeypot driver and configured to generate a preliminary verdict based on the at least one execution stack and the plurality of characteristics of injection of the injected thread, wherein the preliminary verdict determines that the injected thread is a potential malware injection when the preliminary verdict exceeds a predefined threshold; a second machine learning module operably coupled to the virtual honeypot driver and configured to generate VFH security parameters based on at least one of: a CS environment information, the plurality of characteristics of the injected thread, auxiliary information, or the at least one execution stack; and a detector configured to detect the injected thread as a malware injection by performing a heuristic analysis.

In an embodiment, a method for protecting a computing system (CS) against ransomware attacks includes receiving an execution stack from a trusted process; identifying, by analyzing context of at least one of callback for the execution stack, an injected thread associated with the execution stack operating within the trusted process; identifying, by analyzing context of at least one of callback for the execution stack, a plurality of characteristics of injection of the injected thread; applying a first machine learning module to the execution stack and the plurality of characteristics of injection of the injected thread to generate a preliminary verdict, wherein the preliminary verdict determines that the injected thread is a potential malware injection when the preliminary verdict exceeds a predefined threshold; applying a second machine learning module to at least one of: a CS environment information, the plurality of characteristics of the injected thread, auxiliary information, or the at least one execution stack the generate VFH security parameters; generating at least one VFH based on the security parameters; providing the injected thread with the at least one VFH; and detecting the injected thread as a malware injection.

BRIEF DESCRIPTION OF THE DRAWINGS

The invention may be more completely understood in consideration of the following detailed description of various embodiments in connection with the accompanying figures, in which.

DETAILED DESCRIPTION

Figure 1:
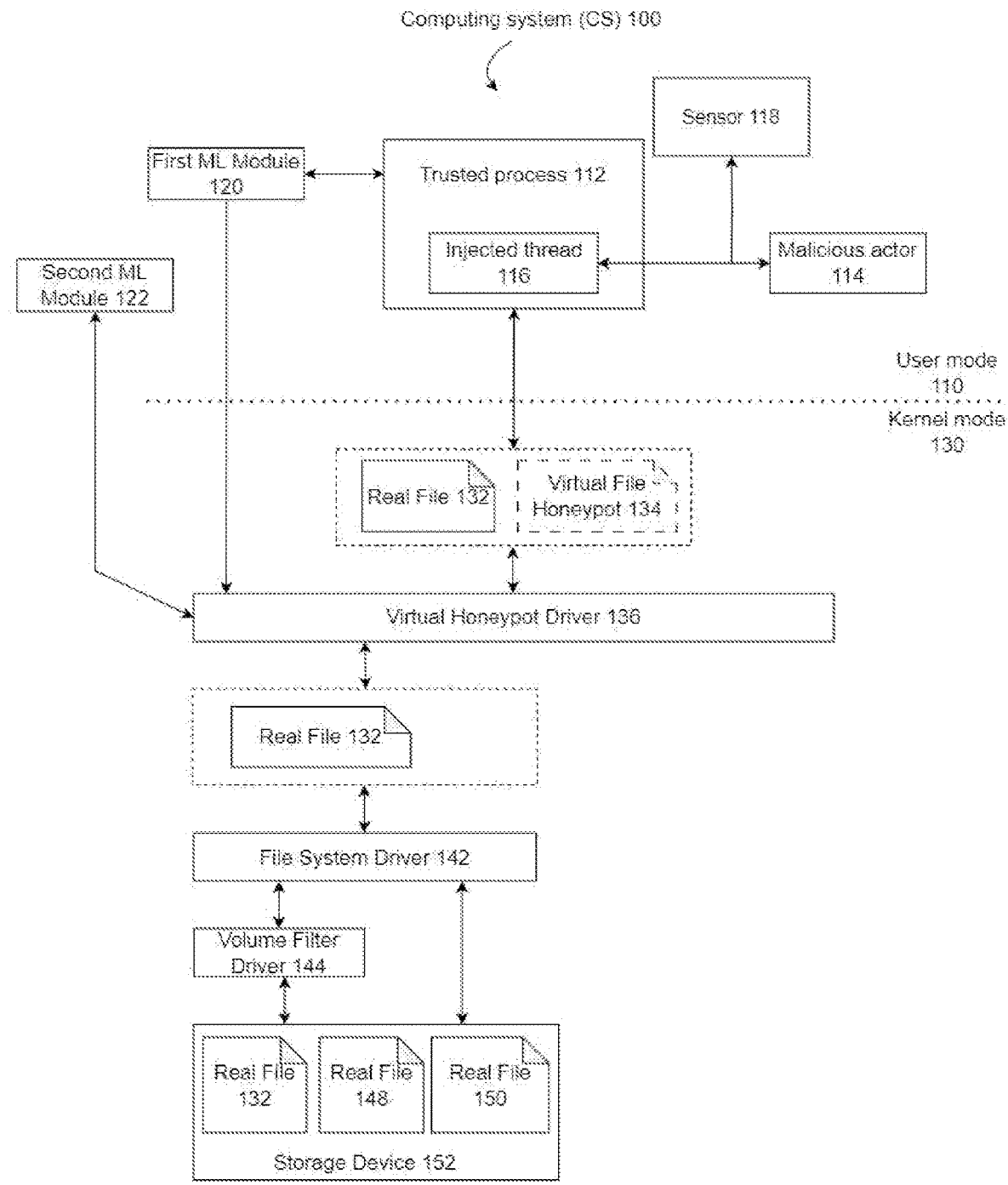
FIG. 1 is a block diagram of a computing system for ransomware protection in injection-based attacks, according to an embodiment.

In an embodiment, a VFH system is deployed to prevent ransomware attacks. In an example, the ransomware is designed by a hacker to encrypt system files such that a decryption key known only to the hacker can be sold at an extortionate price to the owner of the files. The computing system generally comprises a storage device with a plurality of files that are accessed for reading and writing by a variety of processes in user space. Access control takes place in kernel space and employs a virtual honeypot driver to manage virtual file honeypot creation.

The virtual honeypot driver sits between processes seeking to access files on a storage device and the storage device itself. The virtual honeypot driver is configured to identify distinguishing parameters of the CS environment or the injected thread. One or more of these distinguishing parameters are used by the virtual honeypot driver when virtual file honeypots are created to ensure that the virtual file honeypots match the CS environment or injected thread.

Heuristic analysis takes place by examining file-related behavior and characteristics indicative of malicious activity. In the context of ransomware, for example, heuristic analysis aims to detect ransomware attacks by identifying patterns and behaviors that deviate from normal or expected file operations. Certain kinds of heuristic analysis are typically performed when analyzing ransomware attacks for indicia of malicious intent. One example is rapid mass encryption, where a large number of files are rapidly encrypted within a short period. Such behavior is indicative of ransomware trying to encrypt as many files as possible as fast as possible. In addition, determining that encryption of the data is occurring can be based on monitoring the entropy of the monitored data. If the entropy of the data is observed to be growing faster than a predetermined threshold rate, the entropy growth rate can be identified as a sign of ongoing encryption. Another example is the use of unusual file extensions. Ransomware often appends new and unusual file extensions to encrypted files. Heuristic analysis monitors for sudden and widespread changes in file extensions across the system. Inconsistent file modification is another sign of malware. Ransomware may modify files across different directories or drives in an inconsistent manner. Heuristic analysis identifies unusual modification patterns that suggest malicious file encryption. Simultaneous file access is another sign of malware. When multiple files are accessed simultaneously by a process or thread that typically doesn't exhibit such behavior, heuristic analysis can flag such file access as suspicious. Changes in file creation/modification timestamps also suggest ransomware attacks, which can result in the modification of file timestamps, particularly creation and modification times. Heuristic analysis detects abrupt and widespread changes in these timestamps. Another sign of malware is unusual file activity at off-hours. Ransomware attacks are often timed to occur during off-peak hours to avoid immediate detection. Heuristic analysis can give increased scrutiny to file activities that occur at unusual times. A high volume of file writes is also a sign of malware. Ransomware encrypts files by writing encrypted data. Thus, heuristic analysis looks for an unusually high volume of file write operations.

In an embodiment, heuristics used in classification include patterns of full file read, combined delete and create operations, renaming special file extensions, or MIME type changes as the result of file write operations. These operations, when encountered, contribute to the classification of a session as potentially malicious or unsafe. In an embodiment, full-read, delete, and create as a classification heuristic accounts for matching create operations for the full read and delete operation pairs in order to reduce false positives.

These heuristics require access to the file content after modification. The virtual honeypot driver stores file content information after modification. Thus, there is no need to preserve content before the modification because the virtual honeypot driver knows how the content was initially generated.

The virtual honeypot driver presents virtual file honeypots to attract and draw out injected threads acting as ransomware in benign processes. The inserted virtual file honeypots are used for heuristics and are not snapshotted or backed up.

Although a traditional file honeypot may be considered a "virtual" file in the sense that it mimics a real system file, the term "virtual" in the context of a virtual file honeypot does not concern mimicry of real system files. The virtual aspect of a virtual file honeypot driver refers to technical characteristics of the file honeypot. For example, a virtual file honeypot differs from traditional honeypots because it lacks backup storage or any physical presence of its own within the real file system to be protected. Further, a virtual file honeypot is also virtual in the sense that it is generated on-demand in response to a process and may have variable characteristics depending on the specific system or context. Thus, a virtual file honeypot is ephemeral in that it is created on-demand and does not persist in system storage.

In particular, embodiments solve the problem of a malicious actor (e.g. process) injecting threads into benign processes, such that the injected threads do the ransomware work under the hood of the benign process. Embodiments are configured to analyze the call stack(s) of the injected threads and determine a preliminary verdict of benign or malicious using machine learning. Additional sensors can collect data to associate injected threads with other activities or actors to further estimate the injected thread being benign or malicious. If the threat level is high enough, such as over a given threshold, the preliminary verdict can be determined to be malicious. Subsequently, one or more virtual honeypots can be generated for the suspicious threads and the injected thread's response to the virtual honeypots included in anti-ransomware heuristic analysis.

Machine learning refers generally to training computers to make decisions from data without being explicitly programmed. It involves training algorithms on data sets to recognize patterns, make predictions, or perform tasks, becoming more accurate as they process more data. A variety of machine learning techniques may be employed in alternative embodiments. Examples include Supervised Learning, where models learn from labeled data. This includes linear regression for predicting continuous outcomes, logistic regression for classification tasks, and more complex neural networks. Unsupervised Learning, which works with unlabeled data to uncover hidden patterns, may also be used. Techniques like k-means clustering may be used to group similar data points, while Principal Component Analysis is instrumental in reducing the dimensionality of large datasets, aiding in data visualization and efficiency. Semi-Supervised Learning is another option. This technique merges the concepts of supervised and unsupervised learning. Another possible technique is Reinforcement Learning, characterized by using agents that learn optimal behaviors through trial and error in a specific environment. Other possible techniques include Deep Learning (multi-layered neural networks to process large volumes of data), Convolutional Neural Networks (CNNs), and Recurrent Neural Networks (RNNs). Transfer Learning is yet another alternative that involves taking a pre-trained model, like the text-processing GPT, and fine-tuning it for specific tasks. Ensemble Methods, which include Bagging, Boosting, and Stacking, enhance model performance by combining predictions from multiple models. In some embodiments, algorithms like Random Forest (a type of Bagging) and Gradient Boosting Machines can be used for predictive modeling. Other machine learning techniques may also be used, either alone or in combination with the techniques described above, as long as they are consistent with the object and purpose of the invention. The disclosed embodiments are given as examples of possible implementations and embodiments. The invention is not limited to these examples.

Referring to FIG. 1, a block diagram of a computing system 100 for ransomware protection in injection-based attacks is depicted, according to an embodiment. Computing system 100 generally comprises one or more processors and nonvolatile storage media in a networked configuration so that computing resources are available to system users. System 100 includes a user mode 110 where applications and processes originate. In FIG. 1, for example, trusted process 112 runs in user mode 110 along with a number of possible processes. Operating system (OS) thread processes (not depicted) also run in user mode 110.

Trusted process 112 is thus a process configured to execute on CS 100. In an embodiment, trusted process 112 is a known trusted process. For example, trusted process 112 can be identified as safe/trusted according to a valid digital signature associated with trusted process 112.

Malicious actor 114 can comprise a malicious actor, process, thread, object, device, user, process capable of injecting one or more threads into trusted process 112. For example, malicious actor 114 can be a process executing on CS 100. In another example, malicious actor 114 can be a device communicatively coupled to CS 100, such as over a network.

Injected thread 116 is a thread injected into trusted process 112 by malicious actor 114. In an embodiment, injected thread 116 is a malicious thread operating under the hood of trusted process 112. Accordingly, the intent by malicious actor 114 is to disguise the malicious activities of injected thread 116.

Sensor 118 is operably coupled relatively between malicious actor 114 and trusted process 112 and configured to sense characteristics of injected thread 112 or malicious actor 114. For example, sensor 118 is configured to monitor callbacks in CS 100.

First machine learning (ML) module 120 interacts with trusted process 112 to generate a preliminary verdict about injected thread 116. For example, in an embodiment, first ML module 120 uses a machine learning model trained to evaluate an execution stack related to injected thread 116 and information about the injection of injected thread 116 or malicious actor 114 (such as those gathered by sensor 118) to generate a preliminary verdict about whether injected thread 116 is malicious or benign. In an embodiment, the preliminary verdict indicates that injected thread 116 is a potential malware injection when the preliminary verdict exceeds a predefined threshold. In other embodiments, the preliminary verdict indicates that injected thread 116 is a potential malware injection when multiple thresholds are exceeded (such as separate threshold related to the stack, a separate threshold related to the actor, etc.). First ML module 120 can be further coupled to virtual honeypot driver 136 so as to communicate the preliminary verdict to virtual honeypot driver 136 for the generation of VFHs.

In an embodiment, virtual honeypot driver 136 provides injected thread 116 access to virtual file honeypots. In other embodiments, virtual honeypot driver 136 provides access to real files mixed with virtual file honeypots. For purposes of illustration, virtual file honeypot 134 and real file 132 are representative. Virtual file honeypot 134 is generated by virtual honeypot driver 136 with at least one parameter specific to the computer system 100 or injected thread 116. No copy or version of virtual file honeypot 134 is stored on storage device 152. Real file 132 on storage device 152 is obtained by virtual honeypot driver from file system driver 142, either directly or by way of volume filter driver 144. Thus, virtual honeypot driver 136 is able to serve both real files and virtual file honeypots to a process requesting access to storage device 152. Process requests lack direct access to storage device 152 and cannot tell the difference between real files and virtual file honeypots. However, virtual honeypot driver 136 can monitor activity by injected thread 116 on the virtual file honeypots to determine whether a given thread (or process, as operating with an injected thread) is acting on files in a way indicative of malware.

Real file 132 is also managed in kernel mode 130 by file system driver 142 and volume filter driver 144. Both drivers 142 and 144 manage real files 132, 148, and 150 on storage device 152. For purposes of illustration, only real files 132, 148, and 150 are shown in FIG. 1. In most implementations, the number of files will be much larger. File system driver 142 manages the entire storage device 152 and its filesystems. Volume filter driver 144 manages volumes within those filesystems. The volume filter driver 144 detects when changes by a file request are made on a block level of the storage and generates a backup file by copying original values of the changed sectors to free space within data storage according to a copy-on-write (COW) operation. In a copy-on-write operation, when the modification request is made, the original data may be copied into a new storage area, and then the original data block is modified.

Virtual honeypot driver 136 protects the files on storage device 152 by providing injected thread 116 (that may be malware) with at least one VFH and real system files. In the embodiment shown in FIG. 1, virtual honeypot driver 136 has already been configured and has already identified CS 100 and injector parameters. Injected thread 116 has been identified and has been evaluated to preliminarily be indicative of malware. Virtual honeypot driver 136 accordingly provides virtual file honeypots to injected thread 116 on-demand. The mix of real files and virtual file honeypots are represented in FIG. 1 by real file 132 and virtual file honeypot 134. The on-demand virtual file honeypots are generated by virtual honeypot driver 136 to have characteristics and parameters such that they are indistinguishable from real system files to would-be malicious agents.

Second machine learning module 122 interacts with virtual honeypot driver 136 to improve generation of virtual file honeypots by virtual honeypot driver 136. For example, in an embodiment second ML module 122 uses a machine learning model trained to identify and predict details about files in CS 100. For example, patterns in file naming, structure, and content on storage device 152 can be used to train a machine learning model associated with second ML module 122 so that virtual honeypot driver 136 can use the results to create plausible sounding virtually file honeypots with file names, representative file structures, and file content that closely resembles real files on storage device 152.

Accordingly, second ML module 122 is configured to generate VFH security parameters for subsequent creation of VFHs. In an embodiment, second ML module 122 can utilize at least one of CS 100 environment information, malicious actor 114 characteristics (hash, binary file, certificate), auxiliary information, or the at least one execution stack associated with injected thread 116.

In an embodiment, second ML module 122 is integral to the generation of Virtual File Honeypot (VFH) security parameters. VFH security parameters are essential for the creation and deployment of VFHs within computing system 100. Second ML module 122 leverages a diverse set of data sources to formulate security parameters, enhancing the system's ability to safeguard against ransomware attacks and other malicious activities. In embodiments, second ML module 122 can draw upon the following sources to derive the VFH security parameters.

CS 100 Environment Information includes data related to the computing system's type, name, version, operating system type, and operating system version.

Malicious Actor 114 characteristics comprise information about the malicious actor, such as hash values, binary file details, and certificates associated with their activities, can be considered by the second ML module. Such characteristics help in profiling potential threats and informing the VFH security parameters.

In the context of VFHs generation for threat detection and mitigation, malicious actor characteristics such as hash values, binary file details, and certificates play an important role in enhancing the security system's ability to protect against ransomware attacks and other forms of malware. These characteristics can be specifically utilized during VFHs generation.

For example, malicious actor's hash values (e.g. identification of the potential malicious actor) are valuable indicators. During VFHs generation, the history of the concrete malicious actor's hash can be obtained to identify the potential malicious intent and generate specific VFHs using obtained knowledge.

Accordingly, hash whitelisting and blacklisting can be utilized. Embodiments can maintain a database of whitelisted and blacklisted hash values. Whitelisted hashes correspond to legitimate files and are used as references. Hashes that match the blacklist indicate potential threats. VFHs can be generated with the knowledge of these whitelisted and blacklisted hash values to improve the accuracy of threat detection.

In another example, malicious actor binary file details can be utilized; more particularly, binary Fingerprinting such as the analysis of binary files' details includes studying their structure, code patterns, and functions. During VFHs generation, understanding the unique fingerprint of binary files can help in generating VFHs taking into account code patterns, and functions. Embodiments can create VFHs with attributes designed to capture and respond to the specific expected behaviors by these binaries.

In another example, malicious actors certificates can be utilized; more particularly, certificate verification. Malicious actors may attempt to use counterfeit or stolen certificates to appear legitimate. During VFHs generation, embodiments can validate certificates associated with files and processes. Suspicious or unverified certificates can prompt the creation of VFHs with specific security parameters. This also decreases false positives by allowing trusted processes to execute. Embodiments can accordingly check trusted processes with VFHs.

In another example, certificate chain analysis can be utilized. In particular, analyzing the entire certificate chain can reveal anomalies. A certificate with an irregular or untrusted chain can indicate a malicious actor's involvement. VFHs can be configured to closely analyze files associated with such certificates.

By incorporating the aforementioned malicious actor characteristics into VFHs generation, embodiments ensure that VFHs are tailored to detect and respond to specific threats.

Auxiliary Information: a wide range of auxiliary data, including but not limited to File I/O, Registry I/O data, Remote Procedure Call (RPC) calls, Local Procedure Call (LPC) data, scheduled tasks, Component Object Model (COM) server data, network activity data, and intercepted Application Programming Interface (API) data, can be incorporated into the security parameters. This auxiliary information provides valuable context for threat analysis and VFH generation.

Execution stack of injected thread 116: the execution stack associated with the injected thread 116 is another valuable source of information. Analyzing the execution stack helps in understanding the behavior and intent of the injected thread, contributing to the precision of the VFH security parameters.

System 100 is configured so that second ML module 122 has access to virtual honeypot driver 136 so that the result of analysis can be conveyed to and used by virtual honeypot driver 136. In an alternative embodiment, the role of second ML module 122 is supplemented in whole or in part by a threat-intelligence service.

In an embodiment, virtual file honeypot 134 is generated based on security parameters utilizing one or more templates. In an embodiment, templates are pre-designed patterns for creating VFHs and can be utilized as described in the following manner.

Template Generation: Templates for VFHs are created based on the known characteristics and behaviors of the trusted processes and the expected interaction patterns within the computing system environment. These templates can include predefined file structures, access permissions, and interactions with other components.

Adaptation to Security Parameters: Templates are then adapted to the specific security parameters determined by second ML module 122. This adaptation involves configuring the VFHs to align with the unique characteristics and potential threats identified within computing system 100.

Dynamic Customization: VFHs can be dynamically customized based on the current security parameters of computing system 100. This customization can involve adjusting file types, contents, access controls, and other attributes to closely mimic real system files while incorporating elements designed to attract and detect potential malware injections.

Scalability and Variability: Templates allow for the scalable and variable creation of VFHs to ensure that they closely match the expected diversity and complexity of the computing system environment.

In an embodiment, real-world data is used to retrain one or more ML modules. In an embodiment, first ML module 120 can be retrained to identify potential malware injections based on newly collected data corresponding to detected potential malware injections, such as those determined to be malware after VFH presentation and heuristic analysis. In an embodiment, second ML module 122 can be retrained to generate VFHs based on security parameters based on newly collected data corresponding to confirmed malware injections.

In another embodiment, virtual file honeypot 134 is generated by a generative AI module (e.g. a third ML module) according to the generated VFHs security parameters. For example, the generative AI module can be pre-trained based on a large language model (LLM) with a training dataset associated or gathered with the CS, binary module characteristics, and the binary module threat information (such as a threat history). In an embodiment, threat history can be obtained from a threat intelligence service or from one or more internal databases.

In an embodiment, generation of VFHs by artificial intelligence includes the use of advanced machine learning techniques to create VFHs that are strategically designed to attract potential threats, such as ransomware or malware, while minimizing the risk to the actual system. For example, VFHs can be generated by AI according to the following operations.

In an example operation, data collection and analysis using training data is utilized. To create effective VFHs, the AI system uses a diverse and representative training dataset. This dataset can include information about genuine files, directories, and system behaviors within the computing environment. The dataset also includes historical threat data and known malicious behaviors.

In another example operation, feature extraction is utilized. The AI system processes the training data to extract relevant features and characteristics. These features may include file structures, content, metadata, access permissions, timestamps, and historical threat patterns, for example. Feature extraction aims to capture the diversity of files and system behaviors.

In another example operation, machine learning models are utilized. In a particular example, the AI responsible for VFH generation is often a generative AI module. This module can be based on various machine learning models, including deep learning techniques like Generative Adversarial Networks (GANs) or Variational Autoencoders (VAEs). These models demonstrate an ability to generate data that closely mirrors the characteristics of the training data.

In another example operation, the AI is trained. The generative AI module is trained using the training dataset, which includes benign data. During training, the AI learns to generate files that mimic the characteristics found in the training data.

In another example operation, VFH security parameters alignment is utilized. In particular, the generative AI module takes the VFH security parameters into account when creating VFHs. These security parameters are designed to enhance the system ability to detect malicious activities. For example, such parameters can specify that certain VFHs should exhibit the operating system files characteristics to attract ransomware attacks.

In another example operation, dynamic parameter adjustment is utilized. Security parameters can be dynamically adjusted based on the evolving threat landscape. AI can adapt VFH generation to changes in the types of threats or tactics employed by malicious actors.

In another example operation, deployment and monitoring is utilized. In particular, AI-generated VFHs are strategically placed. In one example, the AI-generated VFHs are not placed within the CS, instead the AI-generated VFHs are provided in the response upon request of the potentially malicious injected thread. AI-generated VFHs can be mixed with real system files, making it challenging for potential threats to distinguish between the two.

In another example operation, machine learning model refinement is utilized. In particular, the AI system continues to learn and adapt based on its interactions with potential threats. Embodiments can retrain machine learning models to improve the accuracy and effectiveness of VFH generation and threat detection.

Accordingly, by utilizing AI in VFH generation, embodiments can create VFHs that closely resemble the computing system's environment while being optimized for the detection of malicious activities.

Figure 2:
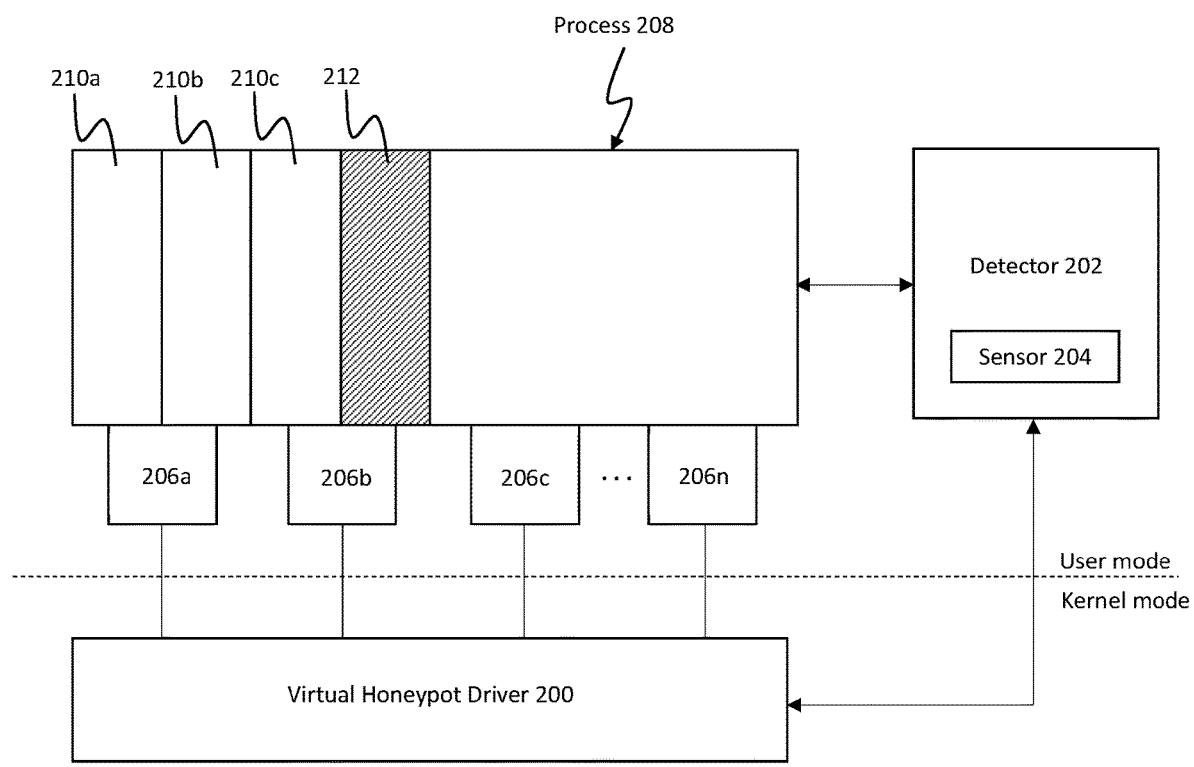
FIG. 2 is a block diagram of a portion of a system for ransomware protection, according to an embodiment.

Referring to FIG. 2, a block diagram of a portion of a system for ransomware protection is depicted, according to an embodiment. Components of the system for ransomware protection of FIG. 2 are implemented in system 100 of FIG. 1 but are shown in FIG. 2 with renumbering for ease of illustration. For example, virtual honeypot driver 200 corresponds to virtual honeypot driver 136 in FIG. 1. Sensor 204 corresponds to sensor 118 in FIG. 1. Likewise, certain functions described with respect to FIG. 1 are incorporated in detector 202 and or control points 206*a-n*.

Accordingly, a system for ransomware protection includes virtual honeypot driver 200, detector 202 utilizing an operably coupled sensor 204, and a plurality of control points 206*a-n*. Embodiments are configured to interact with trusted process 208.

In an embodiment, detector 202 is configured to identify a trusted process launched on a computing device. In an embodiment, detector 202 is configured to analyze the digital signature associated with trusted process 208.

In an embodiment, virtual honeypot driver 200 is configured to identify at least one trusted process. For example, processes based on a thread creation notification as identified by functions, such as PsSetCreateThreadNotifyRoutine. The PsSetCreateThreadNotifyRoutine is a routine that registers a driver-supplied callback that is notified when a new thread is created and when the thread is terminated. Accordingly, when a malicious actor injects a thread into trusted process 208, virtual honeypot driver 200 identifies the thread or process as one to monitor.

PsSetCreateThreadNotifyRoutine also allows for logically linking the ProcessId of an injecting party to the injected process victim, thus giving the attacker's identity. In other embodiments, object manager callbacks can be utilized to identify a given process and further identify the process as trusted.

Detector 202 is further configured to analyze the execution state and behavior of trusted process 208, such as the execution state as captured by respective execution stacks from trusted process 208, as communicated from one or more control points 206a-n to virtual honeypot driver 200 to detector 202.

Detector 202 is further operably coupled to sensor 204. In an embodiment, sensor 204 is configured to monitor callbacks associated with process 208. In an embodiment, callbacks allow detector 202 to identify a process from which the injection is performed, for example, "CreateRemoteThread( )", IPC through user-mode hooking. Accordingly, detector 202 is configured to identify an injector process and associated characteristics by analyzing the context of at least one of callback operation.

Sensor 204 is configured to detect (and detector 202 is further configured to analyze) data related to DLL Load Callbacks; for example, analyzing dynamic link library (DLL) load events and the associated processes to identify unexpected or suspicious DLL injections.

In another example, data related to Process Creation Callbacks can be detected and analyzed, including monitoring and analyzing the creation of new processes, focusing on parent-child process relationships and identifying unusual or unauthorized processes.

In another example, data related to Thread Creation Callbacks can be detected and analyzed, including observing the creation of threads within processes, especially when such threads involve remote thread creation, which may indicate a potential injection.

In another example, data related to Registry Modification Callbacks can be detected and analyzed, including tracking changes to the Windows Registry, as certain registry keys and values can be manipulated by malware to persist or hide its presence.

In another example, data related to File System Operation Callbacks can be detected and analyzed, including examining file-related operations, such as file creation, modification, or deletion, which can reveal suspicious activity like the creation of malicious files.

In another example, data related to Network Callbacks can be detected and analyzed, including monitoring network-related events and communications to identify any unexpected or unauthorized network traffic initiated by processes.

In another example, data related to Kernel Object Callbacks can be detected and analyzed, including analyzing changes to kernel objects, such as device objects, driver objects, and symbolic links, which can be manipulated by malware In another example, data related to Memory Modification Callbacks can be detected and analyzed, including detecting changes to memory regions within processes, which can uncover in-memory injection or manipulation by malicious code.

In another example, data related to interception of API Calls can be detected and analyzed, including intercepting and analyzing Application Programming Interface (API) calls made by processes to identify unusual or unauthorized API usage.

In another example, data related to Interprocess Communication (IPC) Callbacks can be detected and analyzed, including monitoring IPC mechanisms, including named pipes, sockets, and interprocess communication events, to detect suspicious communication between processes.

In another example, data related to User Mode Hooking can be detected and analyzed, including identifying instances where user-mode hooking or hooking of user-level functions is used to manipulate the behavior of processes, potentially indicating malicious intent.

In another example, data related to System Service Table (SSDT) Hooking can be detected and analyzed, including detecting unauthorized modifications to the System Service Table, which can be an indication of rootkit activity.

In another example, data related to ObRegisterCallbacks can be detected and analyzed, including involving the registration of callback functions for monitoring operations performed on Windows objects by various drivers and components. By analyzing ObRegisterCallbacks, the embodiments can detect and characterize potential malware injections, especially when such registrations are associated with suspicious or unauthorized activities. Monitoring these callback registrations can provide insights into attempts to manipulate the behavior of drivers and system objects, which may indicate the presence of malicious code.

In an embodiment, detector 202 can be operably coupled to a machine learning model (e.g. first ML model 120), which can be applied to determine a preliminary verdict of maliciousness. A preliminary verdict can be based on the execution stack and information about the injector actor, the injector process or chain of processes, or the injection thread.

Plurality of control points 206a-n, on which call stack trace or execution stack trace monitoring is performed, are associated with the following events or activities of trusted process 208, including file creation, file cleanup, file close, handle deprecation, file renaming, file deletion, thread creation, writing to virtual memory, and other file-related or memory-related events. In some implementations, control points 206a-n correspond to system calls exposed by the operating system for performing the above-described events or activities, such as "CreateFile( )", "DeleteFile( )", "CreateThread( )", "CreateRemoteThread( )", and "Write VirtualMemory( )". In other example events or activities, control points 206a-n are associated with cleaning up a file, closing a file, duplicating a handle, renaming a file, a registry operation, a Component Object Model (COM) operation, a Remote Procedure Call (RPC) call, or a Local Procedure Call (LPC) call. In an aspect, at least one of control points 206a-n is associated with a system call (e.g., "CreateRemoteThread( )") to create a remote thread that runs in a virtual address space of another process, such as trusted process 208.

Trusted process 208 is depicted in FIG. 2 with a plurality of threads, including benign threads 210a-210c and injected thread 212.

Accordingly, at least one of plurality of control points 206a-n are configured to monitor injected thread 212 of trusted process 208. At least one of plurality of control points 206a-n is further configured to detect activity of injected thread 212 at a particular control point.

In embodiments, control points 206a-n can further monitor threads 210a-210c. In an embodiment, at least one of plurality of control points 206a-n can ignore non-injected processes.

At least one of the plurality of control points 206a-n is further configured to communicate at least one execution stack associated with injected thread 212 to virtual honeypot driver 200.

Detector 202 is further configured to mitigate risk to the computer system of the injected thread. For example, detector 202 can generate an alert to a user and provide the user with detection results including an indication of the injected thread as a malware injection. In another example, detector 202 can suspend the injected thread. In another example, detector 202 can terminate the injected thread. Though not depicted in FIG. 2, as needed, detector 202 can integrate with or utilize user space resources to operate on the injected thread such as to suspend or terminate the thread, if unable to do so in kernel space. In an embodiment, virtual honeypot driver 200 can operate in kernel space on the injected thread such as to suspend or terminate the thread (such as in coordination with detector 202). In another example, detector 202 can perform CS recovery based on an existing snapshot. As discussed above, because VFHs are virtual, CS recovering or snapshotting does not include any VFHs.

Figure 3:
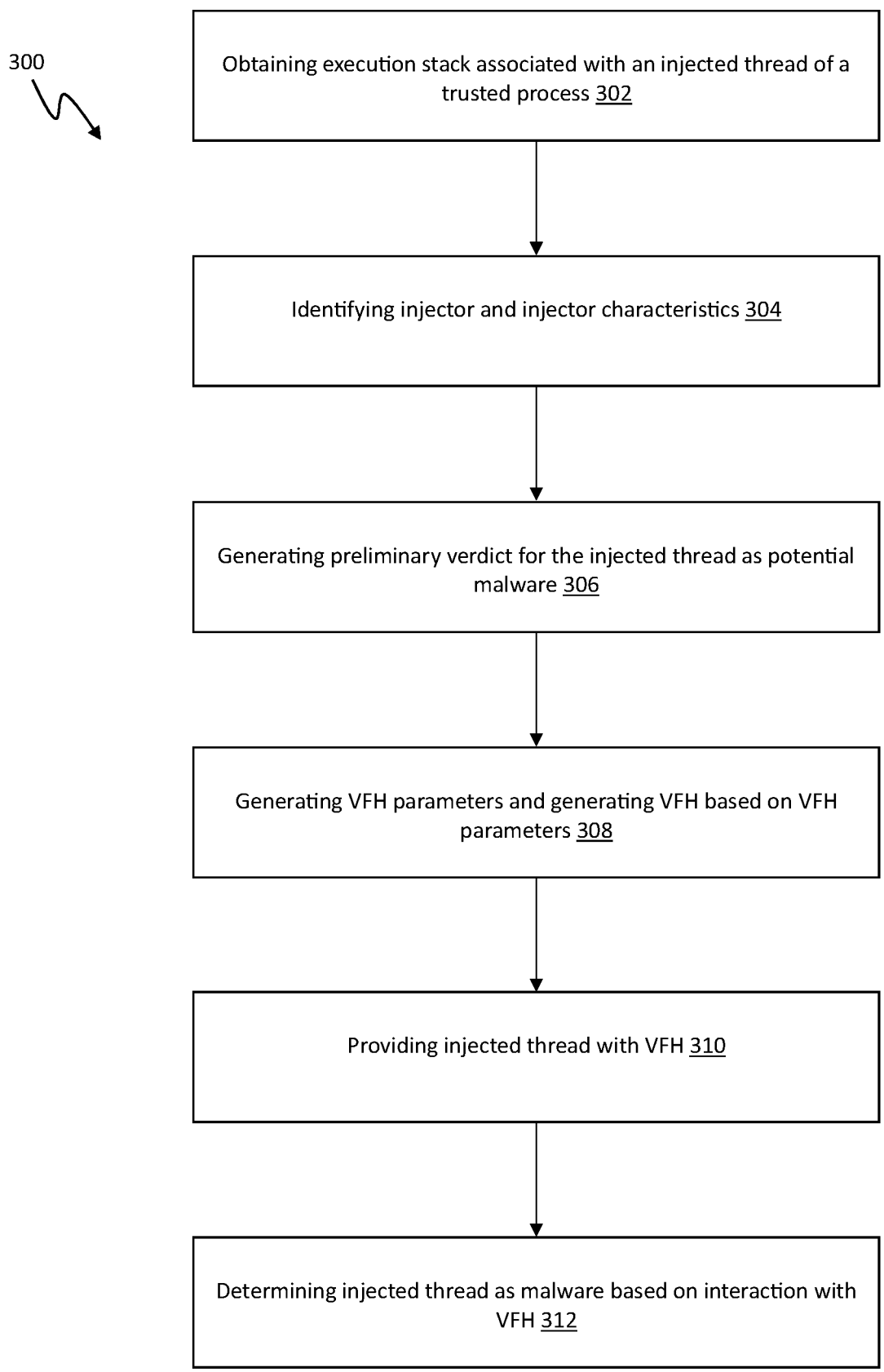
FIG. 3 is a flowchart of a method for ransomware protection in injection-based attacks, according to an embodiment.

Referring to FIG. 3, a flowchart of a method 300 for ransomware protection in injection-based attacks is depicted, according to an embodiment. In an embodiment, method 300 can be implemented by the systems depicted in FIG. 1 or FIG. 2. Reference is made herein to both components of FIG. 1 and FIG. 2 for ease of discussion.

At 302, an execution stack associated with an injected thread of a trusted process is obtained. For example, virtual honeypot driver 200 can obtain an execution stack associated with injected thread 212 from control point 206b.

Though not depicted in FIG. 3, method 300 can further comprise, prior to obtaining an execution stack, identifying a trusted process launched on a computing device, such as by one or more control points 206a-n or detector 202, monitoring one or more threads such as by one or more control points 206a-n, including the injected thread associated with trusted process 208 using at least one control point 206a-n, and detecting activity of the injected thread based on the at least one control point 206a-n. Accordingly, one or more control points 206a-n, such as control point 206b can receive the execution stack from trusted process 208 for subsequent transmission to virtual honeypot driver 200 or detector 202.

At 304, an injector and characteristics about the injection are identified. For example, detector 202 can receive data from or otherwise operate sensor 204 to obtain data related to the injection of injected thread 212. In an embodiment, an injector process (e.g malicious actor 114 in FIG. 1) and characteristics about the injector process are determined based on callback data.

At 306, a preliminary verdict for the injected thread is generated. For example, detector 202 can utilize the execution stack and sensor 204 data, in coordination with a machine learning model, such as that of first ML module 120, to generate a preliminary verdict of maliciousness for injected thread 212.

In an embodiment, as depicted in FIG. 1, first ML module 120 can be applied as operably coupled to virtual honeypot driver 136 and utilize the execution stack, the identity of the injector, and characteristics of the injection to generate a preliminary verdict of maliciousness.

At 308, when the preliminary verdict for the injected thread of 306 is indicative of malware, VFH parameters are generated and at least one VFH is generated based on the VFH parameters. For example, and referring also to FIG. 1, second ML module 122 can be applied to at least one of CS environment information, the injector characteristics, auxiliary information, or the at least one execution stack to generate VFH parameters.

In an embodiment, CS environment information can include information about a CS type, a CS name, a CS version, an operating system type, or an operating system version. In other examples, CS environment information can include information about file types and extensions, common file names, file content, or directory structure, access permissions of files and directories within the CS, creation, modification, and access timestamps within the CS, sensitive data within the CS file interactions with other components in the CS, regulatory and compliance requirements of the CS, or past cybersecurity incidents or known vulnerabilities within the CS environment.

In an embodiment, auxiliary information can include File I/O, Registry I/O data, Remote Procedure Call (RPC) calls, Local Procedural Call (LPC) data, a scheduled task, Component Object Model (COM) server data, network activity data, or intercepted Application Programming Interface (API) data.

Virtual honeypot driver 200 can then generate one or more VFHs specific to injected thread 212. For example, virtual honeypot driver 200 can generate a VFH based on the VFH parameters.

At 310, the injected thread is provided with the VFH generated at 308. For example, and referring also to FIG. 1, virtual file honeypot 134 is provided to the injected thread (e.g. injected thread 212 or injected thread 116 in FIG. 1). In an embodiment at 310, the VFH is provided as part of a mix with real files.

At 312, the injected thread is determined to be malware based on the interaction with the VFH presented at 310. For example, virtual honeypot driver 200 can monitor injected thread 212 interaction with one or more VFHs presented. Such interaction can be communicated to detector 202. In an embodiment, detector 202 can utilize a heuristic analysis to determine a final verdict on whether injected thread 212 is malware.

In some embodiments, the CS environment is an Industrial Control System (ICS). More particularly, an ICS is an electronic control system and associated instrumentation used for industrial process control. Control systems can range in size from a few modular panel-mounted controllers to large interconnected and interactive distributed control systems (DCSs) with many thousands of field connections. Control systems receive data from remote sensors measuring process variables (PVs), compare the collected data with desired setpoints (SPs), and derive command functions that are used to control a process through the final control elements (FCEs), such as control valves. Larger systems are often implemented by supervisory control and data acquisition (SCADA) systems, or DCSs, and programmable logic controllers (PLCs). SCADA and PLC systems are also scalable down to smaller systems with few control loops. When VFH creation takes place in an ICS, the VFH-creation process takes into account the unique characteristics of ICS, such as specialized file types, directory structures, and communication protocols commonly found in industrial settings. In embodiments, VFH creation also considers thread injection specific to ICS environments, such as injection from a malicious actor with control of a distributed device, or the execution stack unique to the ICS.

In some embodiments, the CS is an Internet of Things (IoT) system. IoT generally refers to sensors, processing ability, software, and technologies that connect and exchange data with other devices and systems over the Internet or other communications networks. IoT includes electronics, communication and computer science engineering, using technology that connects the digital and physical worlds. For example, an object is fitted with sensors that monitor temperature or motion. The object can also include actuators, which receive signals from the sensors and then take action in response to those signals. As generally implemented, IoT technologies and products present an attractive attack surface for malicious actors. IoT systems also generate large amounts of data but need quick access to this data without affecting system performance. At the same time, IoT systems usually avoid traditional data storage models, where large amounts of data are stored in one place. For an IoT system, the VFH-creation process considers the distinctive features of IoT devices and networks, which can include different file types, naming conventions, and communication patterns compared to ICS. In embodiments, for an IoT system, VFH creation also considers thread injection specific to IoT environments, such as network-based injection from a malicious actor, or the execution stack unique to the IoT environment.

The VFH-creation process works similarly for other CS environments by incorporating distinctive features of at least one of the environment, the injector characteristics, the particular execution stack, and auxiliary information into the VFHs. For example, the CS environment may be a Building Automation Systems (BAS). BAS often have limited storage resources. Virtual file honeypots are a particularly effective security solution for BAS to minimize the storage footprint while maintaining protection against ransomware threats. BAS, also known as building management systems (BMS) or building energy management systems (BEMS), are typically used to control a building's heating, ventilation and air conditioning (HVAC), electrical, lighting, shading, access control, security systems, and related systems. These systems combine the control of various building automation functions with common control interfaces. For example, a smart building system connects sensors and devices to work in coordination to share data for managed building ecosystems in real time. Leveraging building data and applying artificial intelligence and machine learning (AI/ML) to the data makes the building both programmable and responsive to the needs of the users and the building manager. More particularly, the VFH can be created for low or limited resource components unique to a BAS.

Healthcare Control Systems (HCS) are another example of systems with distinctive features that can be incorporated into VFHs. These systems are traditionally used in healthcare settings, often with limited storage capabilities, that provide software and mobile applications combining real-time, workflow control technologies with best practices used in manufacturing and transportation. HCSs can improve collaboration, patient outcomes, surgeon outreach, utilization, revenue, and profit. Some healthcare organizations have various types of specialized hospital information systems such as electronic health records (EHR) systems, e-prescribing systems, practice management support systems, clinical decision support systems, radiology information systems and computerized physician order entry (CPOE) systems. Virtual file honeypots enhance the security of these systems without significant storage overhead. In embodiments, for an HCS system, VFH creation considers the specific HCS environment, thread injection specific to HCS environments, such as a malicious actor with control of a CPOE operating on EHRs, or the execution stack unique to the HCS environment.

Yet another system type with distinctive features that can be incorporated into VFHs is that of telecommunications infrastructures. Telecommunication infrastructures are known to have limited storage capacity, especially in remote or rural areas. At the same time, telecommunications infrastructures comprise the physical medium through which internet traffic flows, including telephone wires, above and below-ground cables, submarine cables, satellites, microwaves, and mobile technology including latest generation mobile networks such as 5G. Network infrastructure refers to the hardware and software that enable network connectivity and communication between users, devices, applications, and the internet. Telecommunications infrastructure services provide setup, maintenance, and consulting for data and voice communications technologies. Examples of telecommunications infrastructure services include optical fiber installation, cell tower site location, radio antenna testing, installation of standard phone equipment and data networks. These systems present attractive attack surfaces for malicious actors. Virtual file honeypots serve as a viable security measure for these systems because of reduced storage requirements. In embodiments, for a telecommunications system, VFH creation considers the specific telecommunications environment thread injection specific to telecommunications environments, such as network-based thread injection, or the execution stack unique to the telecommunications environment.

Transportation control systems provide another example of a distinctive system for the creation of VFHs. Such systems generally have limited storage resources due to their specialized nature. Transportation control systems are used to manage and optimize flow of traffic on roads, highways, and similar transportation networks. Transportation control systems use sensors, cameras, and communication networks to collect real-time data on traffic conditions and vehicle movements. This data is analyzed and used to control traffic signals, variable message signs, and other traffic management devices. Transportation control systems can also be used to manage public transportation networks, such as buses and trains. These systems can provide real-time information on vehicle locations and arrival times, allowing passengers to plan their journeys more effectively. Transportation control can also be used to optimize routes and schedules, improving the efficiency of public transportation networks. Virtual file honeypots offer an efficient way to protect these systems without increasing the storage footprint. In embodiments, for a transportation control system, VFH creation considers the specific transportation control system environment, thread injection specific to transportation control system environments, such as low or limited resource components unique to transportation control components or the execution stack unique to the telecommunications environment.

In embodiments, VFHs can be created for enterprise security systems. Enterprise security is a multi-faceted concern that includes both the internal or proprietary business secrets of a company as well as the employee and customer data related to privacy laws. Enterprise security is focused on data center, networking, and web server operations, including for social engineering risks. In embodiments, for a transportation control system, VFH creation considers the specific enterprise environment, thread injection specific to enterprise security, such as malicious actors with employee-user facing interfaces, or the stack unique to the enterprise environment.

In embodiments, VFHs can likewise be created for consumer security systems and similarly consider the specific consumer environment, thread injection specific to the consumer security, such as malicious actors with consumer-user facing interfaces, or the stack unique to the consumer environment.

The invention claimed is:

1. A method for protecting a computing system (CS) against ransomware attacks using virtual file honeypots (VFHs) under virtual honeypot driver control, the method comprising:
    identifying a trusted process launched on a computing device;
    monitoring a thread associated with the trusted process using a control point;

detecting activity of the thread based on the control point;
receiving, from the trusted process, an execution stack;
identifying, based on sensor data, an injector associated with injection of an injected thread and determining a plurality of characteristics associated with the injection and corresponding to the injected thread;
applying a first machine learning module to the execution stack and the plurality of characteristics associated with the injection to generate a preliminary verdict, wherein the preliminary verdict determines that the injected thread is a malware injection when the preliminary verdict exceeds a predefined threshold;
generating VFH security parameters by applying a second machine learning module to a CS environment information, the plurality of characteristics of the injected thread, auxiliary information, or the execution stack;
generating a plurality of VFHs based on the security parameters using a generative AI model pretrained based on a large language model (LLM) with a training dataset associated with the CS, binary module characteristics, and a threat history of the binary module;
providing the injected thread with the plurality of VFHs mixed with real system files;
detecting the injected thread as a malware injection by performing a heuristic analysis;
retraining the first machine learning module to identify malware injections based on newly collected data corresponding to detected malware injections; and
retraining the second machine learning module to generate VFHs based on security parameters of newly collected data corresponding to confirmed malware injections.

2. The method of claim 1, further comprising at least one of:
generating an alert to a user and providing the user with detection results including an indication of the injected thread as malware injection;
suspending the injected thread;
terminating the injected thread; or
performing CS recovery based on an existing snapshot, wherein the CS recovering does not include any of the plurality of VFHs.

3. The method of claim 1, wherein the generative AI module uses the VFH security parameters.

4. The method of claim 1, wherein generating a plurality of VFHs based on the security parameters utilizes at least one template.

5. The method of claim 1, wherein auxiliary information includes at least one of File I/O, Registry I/O data, Remote Procedure Call (RPC) calls, Local Procedural Call (LPC) data, a scheduled task, Component Object Model (COM) server data, network activity data, and intercepted Application Programming Interface (API) data.

6. The method of claim 1, wherein the monitoring the thread associated with the trusted process is performed using call stack trace monitoring, and the control point is associated with at leastone event comprising at least one of: create a file, clean up a file, close a file, duplicate a handle, rename a file, delete a file, create a thread, a registry operation, a Component Object Model (COM) operation, a Remote Procedure Call (RPC) call, and a Local Procedure Call (LPC) call.

7. The method of claim 1, wherein the identifying the at least one thread as an injected thread and identifying a plurality of characteristics of the injected thread is performed by analyzing context of at least one of callback operations: DLL Load Callbacks, Process Creation Callbacks, Thread Creation Callbacks, Registry Modification Callbacks, File System Operation Callbacks, Network Callbacks, Kernel Object Callbacks, Memory Modification Callbacks, Interception of API Calls, Interprocess Communication (IPC) Callbacks, User Mode Hooking, System Service Table (SSDT) Hooking, or ObRegisterCallbacks.

8. The method of claim 1, wherein generating VFH security parameters by applying a second machine learning module to the CS environment information includes information about at least one of a CS type, a CS name, a CS version, an operating system type, or an operating system version.

9. The method of claim 1, wherein the CS environment information comprises information about at least one of:
file types and extensions;
common file names, file content, or directory structure;
access permissions of files and directories within the CS;
creation, modification, and access timestamps within the CS;
sensitive data within the CS;
file interactions with other components in the CS;
regulatory and compliance requirements of the CS; or
past cybersecurity incidents or known vulnerabilities within the CS environment.

10. A system for protecting a computing system (CS) against ransomware attacks, the system comprising:
a virtual honeypot driver configured to:
monitor at least one injected thread associated with at least one trusted process using at least one control point,
generate a plurality of VFHs based on security parameters using a generative AI model pretrained based on a large language model (LLM) with a training dataset associated with the CS, binary module characteristics, and a threat history of the binary module, and
provide the injected thread with the plurality of VFHs mixed with real system files,
a sensor configured to determine a plurality of characteristics of injection of the injected thread;
at least one control point configured to:
detect activity of the at least one injected thread, and
provide at least one execution stack for the at least one trusted process to the virtual honeypot driver;
one or more processors and storage media implementing processes in user mode including:
a first machine learning module operably coupled to the virtual honeypot driver and configured to generate a preliminary verdict based on the at least one execution stack and the plurality of characteristics of injection of the injected thread, wherein the preliminary verdict determines that the injected thread is a malware injection when the preliminary verdict exceeds a predefined threshold;
a second machine learning module operably coupled to the virtual honeypot driver and configured to generate VFH security parameters based on at least one of: a CS environment information, the plurality of characteristics of the injected thread, auxiliary information, or the at least one execution stack; and
a detector configured to detect the injected thread as a malware injection by performing a heuristic analysis, wherein the first machine learning module is retrained to identify malware injections based on newly collected data corresponding to detected malware injections, and wherein the second machine learning module is retrained to generate VFHs based on security parameters of newly collected data corresponding to confirmed malware injections.

11. The system of claim 10, wherein the detector is further configured to:
generate an alert to a user and providing the user with detection results including an indication of the injected thread as malware injection;
suspend the injected thread;
terminate the injected thread; or
perform CS recovery based on an existing snapshot, wherein the CS recovering does not include any of the plurality of VFHs.

12. The system of claim 10, wherein the virtual honeypot driver is configured to generate the plurality of VFHs based on the security parameters using the generative AI module according to the VFH security parameters.

13. The system of claim 10, wherein the virtual honeypot driver is configured to generate the plurality of VFHs based on the security parameters using at least one template.

14. The system of claim 10, wherein the virtual honeypot driver is configured to identify at least one thread as an injected thread and identify a plurality of characteristics of the injected thread by analyzing context of at least one of callback operations: DLL Load Callbacks, Process Creation Callbacks, Thread Creation Callbacks, Registry Modification Callbacks, File System Operation Callbacks, Network Callbacks, Kernel Object Callbacks, Memory Modification Callbacks, Interception of API Calls, Interprocess Communication (IPC) Callbacks, User Mode Hooking, System Service Table (SSDT) Hooking, or ObRegisterCallbacks.

15. The system of claim 10, wherein the CS is:
an Industrial Control System (ICS);
an Internet of Things (IoT) system;
a Building Automation Systems (BAS);
a Healthcare Control System;
a Telecommunications Infrastructure;
a Transportation Control System;
an Enterprise Security System; or
a Consumer Security System.

16. A method for protecting a computing system (CS) against ransomware attacks, the method comprising:
receiving an execution stack from a trusted process;
identifying, by analyzing context of at least one of callback for the execution stack, an injected thread associated with the execution stack operating within the trusted process;
identifying, by analyzing context of at least one of callback for the execution stack, a plurality of characteristics of injection of the injected thread;
applying a first machine learning module to the execution stack and the plurality of characteristics of injection of the injected thread to generate a preliminary verdict, wherein the preliminary verdict determines that the injected thread is a malware injection when the preliminary verdict exceeds a predefined threshold;
applying a second machine learning module to at least one of: a CS environment information, the plurality of characteristics of the injected thread, auxiliary information, or the at least one execution stack the generate VFH security parameters;
generating at least one VFH based on the security parameters using a generative AI model pretrained based on a large language model (LLM) with a training dataset associated with the CS, binary module characteristics, and a threat history of the binary module;
providing the injected thread with the at least one VFH;
detecting the injected thread as a malware injection;
retraining the first machine learning module to identify malware injections based on newly collected data corresponding to detected malware injections; and
retraining the second machine learning module to generate VFHs based on security parameters of newly collected data corresponding to confirmed malware injections.

17. The method of claim 1, further comprising ignoring non-injected processes.

18. The system of claim 10, wherein the virtual honeypot driver is further configured to ignore non-injected processes.

19. The method of claim 1, wherein the VFH security parameters are generated based on a hash associated with the injected thread.

20. The method of claim 10, wherein the VFH security parameters are generated based on a hash associated with the injected thread.

* * * * *